patent
2,907,670

PIGMENT DISPERSIONS

Leon Katz, Springfield, N.J., Adolph Fuerst, Brooklyn, N.Y., and Robert E. Brouillard, Westfield, N.J., assignors to General Aniline & Film Corporation, New York, N.Y., a corporation of Delaware No Drawing. Application March 22, 1957
Serial No. 647,740

7 Claims. (Cl. 106—308)

This invention relates to the preparation of pigment dispersions suitable for use in coloring paper, filamentary and other textile materials, plastics and, especially, in pigmenting latex paints. More particularly, this invention relates to the preparation of pigment dispersions, suitable for use in the pigmenting of latex paints, employing nonionic dispersing agents.

Pigment dispersions are usually prepared by procedures involving the application of intense mechanical action, such as mixing and kneading, to a mixture of pigment presscake, dispersing agent and water. Thus, anionic aqueous dispersions may be made by intimately mixing the pigment, dispersing agent and water in a suitable comminution apparatus, such as a ball mill, a dough mixer as a Werner-Pfleiderer or Baker-Perkins mixer, a colloid mill or high speed dispersors as the Eppenbach or Kady mills. In each instance, a dispersion is obtained which is suitable for various applications. However, in certain systems such as latex paints, which are emulsions of a film-forming polymer in an aqueous vehicle, these anionic aqueous dispersions fail in many instances. The failures arise for the reasons that the dispersion breaks the emulsion or the presence of salts in the anionic dispersion results in poor water resistance of the final paint film. To overcome these deficiencies, the use of nonionic dispersions has been suggested. Unfortunately, the preparation of nonionic dispersions by conventional dispersion techniques presents many manufacturing difficulties and the dispersions obtained are far from satisfactory. Most of these difficulties are due to the foaming tendency of nonionic dispersing agents when they are agitated, shaken or milled in an aqueous system. Because of this objectionable feature, manufacturing capacities are limited even with large equipment. Furthermore, processing times are abnormally high and the product quality does not result in maximum brilliance and color value when the dispersions formed are used in pigmenting latex paints.

It is an important object of this invention to provide a novel process for the preparation of pigment dispersions which will be free from the foregoing and other disadvantages and which will produce pigment dispersions developing high color value having excellent resistance to deterioration by flocculation, aggregation and agglomeration.

Other objects and advantages of this invention will be apparent from the following specification and claims.

We have found that the foregoing objects are readily obtained by working in a suitable mixing machine an intimate aqueous mixture of a pigment and nonionic dispersing agent within a relatively narrow temperature range and for a time sufficient to produce ultra fine dispersions. It is preferred to employ the pigments in the form of water presscakes or pulps.

In accordance with the process of our invention, it is essential that the mixture of pigmented pulp and nonionic dispersing agent in the mixing machine be worked at a temperature of 60 to 100° C. until a well kneading plastic mass is obtained. The ratio of pigment to dispersing agent may be as high as 1:1 but we found it preferable to operate at a rate of 2:1 or 3:1. After the mixing step is completed, the water is decanted and the mass is kneaded until the pigment particle size is from 0.1 to 2.0µ in diameter, but mostly below 0.8µ in diameter. This usually takes from 1 to 16 hours. After the desired dispersion has been attained, the temperature may be lowered and water is then added to the mass, preferably in small portions, until a flowing paste is obtained; or, if desired, the mass may be evaporated to dryness to form water-dispersible powders. When the product obtained in accordance with this invention is incorporated into a latex paint, it develops maximum brilliance in color value. Moreover, no flocculation after aging occurs.

Holding the temperature of the mixture of pigment pulp and nonionic agent to a temperature between 60 and 100° C. during the mixing thereon causes the surprising phenomenon of preferential wetting to occur, i.e. causes a water-soluble nonionic dispersing agent which is miscible in all proportions with water at room temperature to be thrown out of solution at a temperature between 60 and 100° C. It is unexpected that a nonionic dispersing agent, which is completely miscible with water, will at temperatures of 60 to 100° C. preferentially wet the pigment and cause the separation of a water phase. The water can be removed from the resultant two-phase system by decantation and the remaining mass is then milled to obtain an excellent dispersion. We have found that this selective affinity of the hydrophilic nonionic agent for organophilic substances does not occur at room temperatures and dispersion is not effected.

The separation of a water phase seems to hinge on the cloud point of the non-ionic dispersing agent used. This cloud point may be defined as the temperature at which a 1% aqueous solution of the agent turns cloudy, above which it remains cloudy, and below which it is clear. Since the cloud point varies directly with the number of alkylene oxide linkages, a water-soluble nonionic dispersing agent of such polyoxyalkylene chain length was chosen that allowed the mixing of the pigment pulp and agent at the temperature of the cloud point of said agent, or at a temperature exceeding said cloud point.

The pigment employed in accordance with the present invention is immaterial so long as it is substantially insoluble in the medium in which it is subsequently to be used. However, we prefer to employ phthalocyanine pigments which include metal-free phthalocyanines, copper phthalocyanines, nickel phthalocyanines, cobalt phthalocyanines, derivatives thereof, such as the chloro, polychloro derivatives and the like. Good results are also obtained by the use of vat pigments of the indigoid and quinonoid series such as Indanthrene Red FBB (PR 296) and Indanthrene Brilliant Orange GR.

The nonionic dispersing agents employed in accordance with our invention have the following general formula:

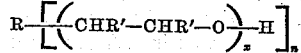

wherein:

R is the residue of an organic hydrophilic compound having at least one active hydrogen, R' is selected from the group consisting of hydrogen, and lower alkyl radicals, $x$ represents the number of moles of alkylene oxide condensed with the parent organic compound and is an integer in the range of 6 to 100, and $n$ corresponds to the number of active hydrogen atoms in the parent compound and is a small integer, i.e. 1 to 4.

Examples of R include the residue from compounds, such as monofunctional alcohols, e.g. methanol, butanol, etc.; di- or polyfunctional alcohols, such as trimethylolethane; alkyl or bisalkyl phenols, such as nonyl phenol; aliphatic mercaptans, such as ethyl and butyl mercaptans, etc.; aliphatic carboxylic acids, such as formic acids, acetic acid and butyric acid; N-substituted amides, such as methyl acetamide; sulfonic acids; N-substituted sulfonamides, such as N-propyl ethanesulfonamide and other compounds having one active hydrogen, as above described.

The preparation of some of the types of non-ionic dispersing agents mentioned above are disclosed, for example, in U.S. Patent No. 2,213,477 to Steindorff et al., U.S. Patent No. 2,174,761 to Schuette et al., U.S. Patent No. 1,970,578 to Schoeller et al., and U.S. Patent No. 2,496,582 to Enyeart. Specifically, U.S. Patent No. 2,213,477 to Steindorff et al. relates to the preparation of glycol and polyglycol ethers of isocyclic hydroxyl compounds, of which class of compounds the condensation products of nonyl phenol and ethylene oxide are members.

Since the dispersing agents employed in accordance with this invention are nonionic in character, the water-solubilizing group that is added to the active moiety must be nonionic in character and is preferably a hydrophilic polyoxyalkylene chain and this chain must be present in amounts sufficient to render the dispersing agent water-soluble. To meet the solubility requirement, accordingly, the hydrophilic polyoxyalkylene chain must constitute at least about 25% by weight of the dispersing agent.

While any of the above nonionic dispersing agents may be employed in preparing the pigment dispersions in accordance with our invention, we prefer to employ a condensation product of nonyl phenol and ethylene oxide wherein the mole ratio of ethylene oxide to nonyl phenol is from 9.5 to 30.0.

The following examples will serve to illustrate our invention, it being clearly understood, however, that the specific conditions and preparations given therein should not be limitative, but only illustrative, of the preferred methods of performing the process of our invention.

*Example I*

150 parts by weight of copper phthalocyanine as a 25% presscake and 50 parts by weight of a condensation product of nonyl phenol and ethylene oxide are worked in a Werner-Pfleiderer mixer at 100° C. to a well-kneading mass, and forming a two-phase system. Water is decanted and the mass is then kneaded 5 hours. Water is now added in small portions till a flowing paste is obtained. The observable pigment particle size in the resulting dispersion varies from 0.4 to $1\mu$ in diameter, but is mostly below $0.8\mu$. The product obtained developed maximum brilliance and color value when incorporated into a styrene butadiene latex paint. In addition, there was no evidence of flocculation after ageing.

*Example II*

150 parts by weight of hexadecachloro copper phthalocyanine but used as a 35% presscake, and 80 parts by weight of a condensation product from nonyl phenol and ethylene oxide are worked in a Werner-Pfleiderer mixer at 100° C. to form a plastic mass, and forming a two-phase system. After removal of water, the mass is kneaded 4 hours. Water is then added little by little till a flowing paste is obtained. The pigment particle size in the resulting dispersion varies from 0.1 to $0.5\mu$ in diameter.

If desired, this plastic mass after dispersion is complete may be dried and pulverized to give a water dispersible powder.

The product obtained developed maximum brilliance and color value when incorporated into a styrene butadiene latex paint. In addition there was no evidence of flocculation after ageing.

*Example III*

160 parts by weight of Indanthrene Red FBB (PR 296) as an 18% presscake and 80 parts by weight of a condensation product of nonyl phenol and ethylene oxide are work in a Werner-Pfleiderer mixer at 100° C. This mass is kneaded 4 hours. Water is then added to effect a flowing paste. The pigment particle size in the resulting dispersion varies from 0.4 to $2.0\mu$ in diameter.

The product obtained developed maximum brilliance and color value when incorporated into a styrene butadiene latex paint. In addition, there was no evidence of flocculation after ageing.

*Example IV*

150 parts by weight of copper phthalocyanine as a 25% presscake, and 150 parts by weight of a condensation product of nonyl phenol and ethylene oxide are worked in a Werner-Pfleiderer mixer at 100° C., and forming a two-phase system. After removal of water, this mass is kneaded 16 hours. Water is then added slowly till a flowing paste is obtained. The pigment particle size in the finished dispersion is uniformly less than $0.8\mu$ in diameter.

The product developed maximum brilliance and color value when incorporated into a styrene butadiene latex paint. In addition, there was no evidence of flocculation after ageing.

*Example V*

150 parts by weight of hexadecachloro copper phthalocyanine as a 32% presscake, and 150 parts by weight of a condensation product from nonyl phenol and ethylene oxide are worked in a Werner-Pfleiderer mixer at 100° C. to a well-kneading mass. This mass is cooled and allowed to knead 1 hour. Slow addition of water is then undertaken until a flowing paste results. The pigment particle size in the dispersion thus obtained is almost without exception less than $0.8\mu$ in diameter.

The product obtained developed maximum brilliance and color value when incorporated into a styrene butadiene latex paint. In addition, there was no evidence of flocculation after ageing.

The products obtained in accordance with this invention may also be incorporated into polyvinyl acetate and polyacrylate-type paints with very satisfactory results.

It is to be understood that the foregoing detailed description is merely given by way of illustration and that many variations may be made therein without departing from the spirit of our invention.

Having described our invention, what we desire to secure by Letters Patent is:

1. Process for the preparation of pigment dispersions, which comprises mixing an aqueous mass of pigment with a nonionic dispersing agent of the general formula

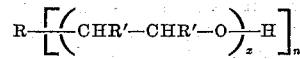

wherein R is the residue of an organic hydrophilic compound having at least one active hydrogen, R' is selected from the group consisting of hydrogen and lower alkyl radicals, $x$ represents the number of moles of alkylene oxide condensed with the parent organic compound and is an integer in the range of 6 to 100, and $n$ corresponds to the number of active hydrogen atoms in the parent compound and is an integer in the range of 1 to 4, at a temperature between 60 and 100% C.

2. Process for the preparation of pigment dispersions, which comprises mixing an aqueous mass of pigment with a nonionic dispersing agent of the general formula

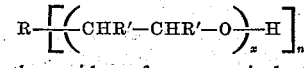

wherein R is the residue of an organic hydrophilic compound having at least one active hydrogen, R' is selected from the group consisting of hydrogen and lower alkyl radicals, $x$ represents the number of moles of alkylene oxide condensed with the parent organic compound and is an integer in the range of 6 to 100, and $n$ corresponds to the number of active hydrogen atoms in the parent compound and is an integer in the range of 1 to 4, at a temperature between 60 and 100° C. until a pigment particle size of from 0.1 to 2.0µ is attained, and adding to the resultant mass water in an amount sufficient to form a flowing paste.

3. Process for the preparation of pigment dispersions, which comprises mixing an aqueous mass of pigment with a nonionic dispersing agent of the general formula

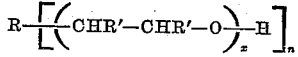

wherein R is the residue of an organic hydrophilic compound having at least one active hydrogen, R' is selected from the group consisting of hydrogen and lower alkyl radicals, $x$ represents the number of moles of alkylene oxide condensed with the parent organic compound and is an integer in the range of 6 to 100, and $n$ corresponds to the number of active hydrogen atoms in the parent compound and is an integer in the range of 1 to 4, at a temperature between 60 and 100° C., the ratio of pigment to dispersing agent being from 1:1 to 3:1.

4. Process for the preparation of pigment dispersions, which comprises mixing an aqueous mass of pigment with a nonionic dispersing agent of the general formula

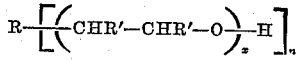

wherein R is the residue of an organic hydrophilic compound having at least one active hydrogen, R' is selected from the group consisting of hydrogen and lower alkyl radicals, $x$ represents the number of moles of alkylene oxide condensed with the parent organic compound and is an integer in the range of 6 to 100, and $n$ corresponds to the number of active hydrogen atoms in the parent compound and is an integer in the range of 1 to 4, at a temperature of 60 to 100° C., removing water from the mass, kneading the mass until a pigment particle size of from 0.1 to 2.0µ is obtained, and adding water in an amount sufficient to form a flowing paste.

5. Process for the preparation of pigment dispersions, which comprises mixing an aqueous mass of phthalocyanine pigment with a nonionic dispersing agent of the general formula

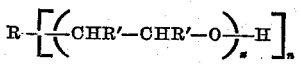

wherein R is the residue of an organic hydrophilic compound having at least one active hydrogen, R' is selected from the group consisting of hydrogen and lower alkyl radicals, $x$ represents the number of moles of alkylene oxide condensed with the parent organic compound and is an integer in the range of 6 to 100, and $n$ corresponds to the number of active hydrogen atoms in the parent compound and is an integer in the range of 1 to 4, at a temperature between 60 and 100° C., the ratio of pigment to dispersing agent being from 1:1 to 3:1.

6. Process for the preparation of pigment dispersions, which comprises mixing an aqueous mass of phthalocyanine pigment with a nonionic dispersing agent comprising a condensation product of nonyl phenol and ethylene oxide, at a temperature of about 100° C., removing the water from the mass, kneading the remaining mass until a pigment particle size of from 0.1 to 2.0µ is attained, and adding water in an amount sufficient to form a flowing paste.

7. Process for the preparation of pigment dispersions, which comprises mixing an aqueous mass of phthalocyanine pigment with a nonionic dispersing agent, comprising a condensation product of nonyl phenol and ethylene oxide, at a temperature of about 90° C., permitting the mixture to form a two-phase system including a water phase, removing the water phase by decantation, kneading the remaining mass until the pigment particle size is from 0.1 to 2.0µ in diameter, and adding water in an amount sufficient to form a flowing paste.

References Cited in the file of this patent

UNITED STATES PATENTS

| | | |
|---|---|---|
| 1,970,578 | Schoeller et al. | Aug. 21, 1934 |
| 1,986,029 | Todd | Jan. 1, 1935 |
| 2,174,761 | Schuette et al. | Oct. 3, 1939 |
| 2,213,477 | Steindorff et al. | Sept. 3, 1940 |
| 2,294,381 | Burdick | Sept. 1, 1942 |
| 2,342,581 | Hoffmann | Feb. 22, 1944 |
| 2,496,582 | Enyeart | Feb. 7, 1950 |
| 2,623,827 | Moos | Dec. 30, 1952 |
| 2,637,711 | Auer | May 5, 1953 |
| 2,677,700 | Jackson | May 4, 1954 |
| 2,727,827 | Chertkop | Dec. 20, 1955 |
| 2,795,564 | Conn et al. | June 11, 1957 |

OTHER REFERENCES

Pages 203–205 and 476 of the publication entitled "Surface Active Agents," 1949, by Schwarts and Perry.